US008045850B2

(12) United States Patent
Tanoue

(10) Patent No.: US 8,045,850 B2
(45) Date of Patent: *Oct. 25, 2011

(54) IMAGE PICKUP APPARATUS, IMAGE RECORDING APPARATUS AND IMAGE RECORDING METHOD

(75) Inventor: Yasuyuki Tanoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/769,179

(22) Filed: Apr. 28, 2010

(65) Prior Publication Data

US 2010/0209078 A1   Aug. 19, 2010

Related U.S. Application Data

(63) Continuation of application No. 10/562,339, filed as application No. PCT/JP2004/009236 on Jun. 23, 2004, now Pat. No. 7,725,015.

(30) Foreign Application Priority Data

Jun. 26, 2003   (JP) ................................ P2003-182626

(51) Int. Cl.
G03B 17/00 (2006.01)
G03B 41/00 (2006.01)
(52) U.S. Cl. ......................................... 396/56; 396/322
(58) Field of Classification Search .................... 396/56, 396/322
See application file for complete search history.

(56) References Cited

U.S. PATENT DOCUMENTS

| 5,572,248 A | 11/1996 | Allen et al. |
| 6,359,837 B1 | 3/2002 | Tsukamoto |
| 7,015,954 B1 | 3/2006 | Foote et al. |
| 7,649,551 B2 * | 1/2010 | Ohmura et al. ............ 348/211.3 |
| 7,693,413 B2 * | 4/2010 | Sueyoshi et al. ............... 396/333 |
| 7,725,015 B2 * | 5/2010 | Tanoue ........................... 396/56 |
| 2002/0001468 A1 | 1/2002 | Kaku |
| 2002/0032911 A1 | 3/2002 | Tanaka et al. |
| 2006/0007317 A1 | 1/2006 | Lin |
| 2006/0104541 A1 | 5/2006 | Baker et al. |
| 2006/0171695 A1 * | 8/2006 | Jung et al. ....................... 396/56 |

FOREIGN PATENT DOCUMENTS

| JP | 4 51690 | 2/1992 |
| JP | 5-41743 | 2/1993 |
| JP | 6 197335 | 7/1994 |
| JP | 6-325180 | 11/1994 |
| JP | 7-115611 | 5/1995 |
| JP | 9-186959 | 7/1997 |
| JP | 9-233458 | 9/1997 |
| JP | 2000 115597 | 4/2000 |
| JP | 2002-77887 | 3/2002 |

* cited by examiner

Primary Examiner — Rodney Fuller
(74) Attorney, Agent, or Firm — Frommer Lawrence & Haug LLP; William S. Frommer; Thomas F. Presson

(57) ABSTRACT

An imaging apparatus selectively recording an image taken by itself or at least one other apparatus is disclosed. A digital video camera selects between an image taken by a camera block (10) thereof, and an image taken by each of at least one other camera and received by a wireless communication module (120), and records the selected image on a magnetic tape of a video cassette (111). The camera transmits an image it takes to at least other camera by the communication module (120). Processed by a control portion (60), the image taken by the camera itself and the image(s) from the other camera(s) are composited to be concurrently presented on a LCD (80). An image selected through a touch panel (90) is recorded on the tape.

16 Claims, 12 Drawing Sheets

⊗ :CL1   ⊘ :CL2   ○ :CL3   ⊘ :CL4 ically taken by a plurality of video cameras to
IMAGE PICKUP APPARATUS, IMAGE RECORDING APPARATUS AND IMAGE RECORDING METHOD This is a continuation of application Ser. No. 10/562,339, filed Dec. 23, 2005, now U.S. Pat. No. 7,725,015, which is entitled to the priority filing date of PCT/JP2004/009236, filed on Jun. 23, 2004, which is a 371 application and claims the benefit of Japanese application JP2003-182626 filed on Jun. 26, 2003, the entirety all of which are hereby incorporated herein by reference.

TECHNICAL FIELD

The present invention relates to an imaging apparatus, an image recording apparatus, and an image recording method, for taking and recording an image, and particularly to an imaging apparatus, an image recording apparatus, and an image recording method, which are suitably used when a plurality of imaging apparatuses respectively take images.

BACKGROUND ART

Recently, a digital video camera for home use capable of taking a moving image and recording the moving image in the form of digital data is widely used. Such a video camera can play an image signal captured and recorded by the video camera itself, and display the image signal on a LCD (Liquid Crystal Display) in the video camera or on an external monitor. Some digital video cameras additionally have a function to record in a recording medium an image signal which is received from another imaging apparatus or image recording apparatus through a communication cable or others. Further, there has been proposed a video camera apparatus having a function to transmit an image signal taken by an imager of the video camera apparatus itself, together with an audio signal taken by an audio collecting portion thereof, to an external device, through a wireless transmitter or others incorporated in the video camera apparatus (disclosed in paragraphs [0013]-[0018], FIG. 1 in JP-A-11-306663, for instance).

On the other hand, in the professional area such as broadcasting, it is common to make a selection among image signals respectively taken by a plurality of video cameras to record the selected image signal. Further, there have been proposed methods for making a selection among image signals such that an object to be imaged is predetermined, and an image in which the object is present is automatically recognized and selected. For instance, there is known an apparatus for automatically controlling monitoring cameras where data on each of a plurality of persons as an object to be imaged and data on a setup of a plurality of cameras, for instance, are registered in a database beforehand, and when any of the persons approaches a restricted area, the small transmitter carried by the person is detected by an antenna so that a search is made in the database in response to a signal indicative of the detection, in order to select a monitoring camera to control based on the result of the search (as disclosed in paragraphs [0014]-[0019] and FIG. 1 in JP-A-9-46694, for instance). A similar selection and control of cameras can be realized by having each of a plurality of persons as an object to be imaged carry a wireless tag. Further, there has been proposed a system for a convention or others where a camera and a microphone are prepared for each of participants so that the camera image signal from which is selected to be recorded is changed in accordance with audio levels of speeches made through the microphones.

With spreading of home-use video cameras, recently it is often the case that each of a plurality of spectators or participants brings a video camera in a venue such as an athletic meet or a wedding ceremony. In such a situation, it is requested that each video camera of a person can use not only an image taken by the video camera itself, but also images taken by the other video cameras of the other persons. However, such a function is not conventionally offered.

Usually, a video camera records audio as well as image. Where the video camera an image signal from which is selected to be recorded is switched among a plurality of video cameras, it is often the case that a viewer feels that upon the switching, innaturality in audio continuity is more undesirable, than shifting in the scene on a screen along with irregularity in the screen due to the shifting. However, there has not been proposed a way to lessen the undesirability felt by the viewer for the unnatural audio continuity upon the switching.

In a case where an image to be recorded in a recording medium is selected among a plurality of images taken, it is preferable that an image wherein a predetermined object is present is automatically recognized and recorded. However, a method in which a person as an object to be imaged should carry a small transmitter, a wireless tag or others, like in the technique disclosed in the above-mentioned publication JP-A-9-46694, needs to introduce a communication system using the small transmitter, wireless tag or others, in addition to means for transmitting and receiving image and audio signals, which leads to increase in the cost and size of the apparatus. Further, the method of switching the camera the image from which is selected based on the audio levels of the speeches made by the object persons to be imaged, is suitable only for particular uses such as in convention, and not versatile.

The present invention has been developed in view of the above-described problems, and therefore it is an object of the invention to provide an imaging apparatus capable of recording an image selected among images taken by a plurality of the imaging apparatuses, respectively.

Another object of the invention is to provide an image recording apparatus capable of recording an image selected among images taken by a plurality of imaging apparatuses, respectively.

Further another object of the invention is to provide an image recording method for an imaging apparatus, according to which an image is selected among images taken by a plurality of the imaging apparatuses, respectively, and the selected image is recorded.

DISCLOSURE OF THE INVENTION

To solve the above objects, the present invention provides An imaging apparatus for taking and recording an image, characterized by comprising: imager which takes an image; communicator which transmits/receives a signal to/from at least one external imaging apparatus; displayer which displays an image; image compositor which makes the displayer concurrently present, in a composite manner, the image taken by the imager, and at least one image respectively taken by and transmitted from each of at least a part of the at least one external imaging apparatus and received by the communicator; image selector which selects a desired image among the image taken by the imager and the at least one received image; and recorder which records, in a recording medium, a signal of the image selected by the image selector.

The imaging apparatus can take an image by the imager, and receive the image taken by and transmitted from the external imaging apparatus by the communicator. The image compositor makes the displayer to concurrently present, in a composite manner, the image taken by the imager and the image received from the external imaging apparatus. The image selector selects a desired image from the image taken by the imager and the image received. The recorder records the signal of the image selected by the image selector in the recording medium. To this end, a user browses the images presented in the displayer, and makes the image selector to select the image the user desires so as to record the image in the recording medium.

It may be arranged such that the signal of the image taken by the imager can be transmitted to the external imaging apparatus by the communicator. When such an arrangement is employed, it is made possible to transfer images between/among a plurality of imaging apparatuses that are the same in structure, irrespective of by which imaging apparatus each image has been taken, and to selectively record an image.

This invention further provides a method for recording images respectively taken by a plurality of imaging apparatuses, characterized in that each of the imaging apparatuses is capable of: transmitting a signal of an image taken by the each imaging apparatus to at least one of the other imaging apparatus, and receiving at least one signal of a respective image or images respectively taken by at least a part of the other imaging apparatuses; compositing the image taken by the each imaging apparatus, and the at least one image respectively received from the at least a part of the other imaging apparatuses, to concurrently present the image taken by the each imaging apparatus and the at least one received image on a screen; and selecting a desired image from the image taken by the each imaging apparatus and the at least one image taken by each of the at least a part of the other imaging apparatuses, and recording the signal of the selected image.

According to the image recording method, each of the imaging apparatuses taking respective images transmits the signal of the image taken by the each imaging apparatus to at least a part of the other imaging apparatuses, receives the signal of the at least one image respectively taken by the at least a part of the other imaging apparatuses, concurrently presents, on a screen and in a composite manner, the image the each imaging apparatus takes and the at least one image respectively received from the at least a part of the other imaging apparatuses, selects a desired image from these images, and records the signal of the selected image in the recording medium. Therefore, it is made possible that the images taken by the respective imaging apparatuses are transferred among the imaging apparatuses that are the same in structure, so that an image is selectively recorded in each imaging apparatus. A user of each imaging apparatus can browse the images presented on the screen and select a desired image to record in the recording medium.

BEST MODE FOR CARRYING OUT THE INVENTION

Figure 1:
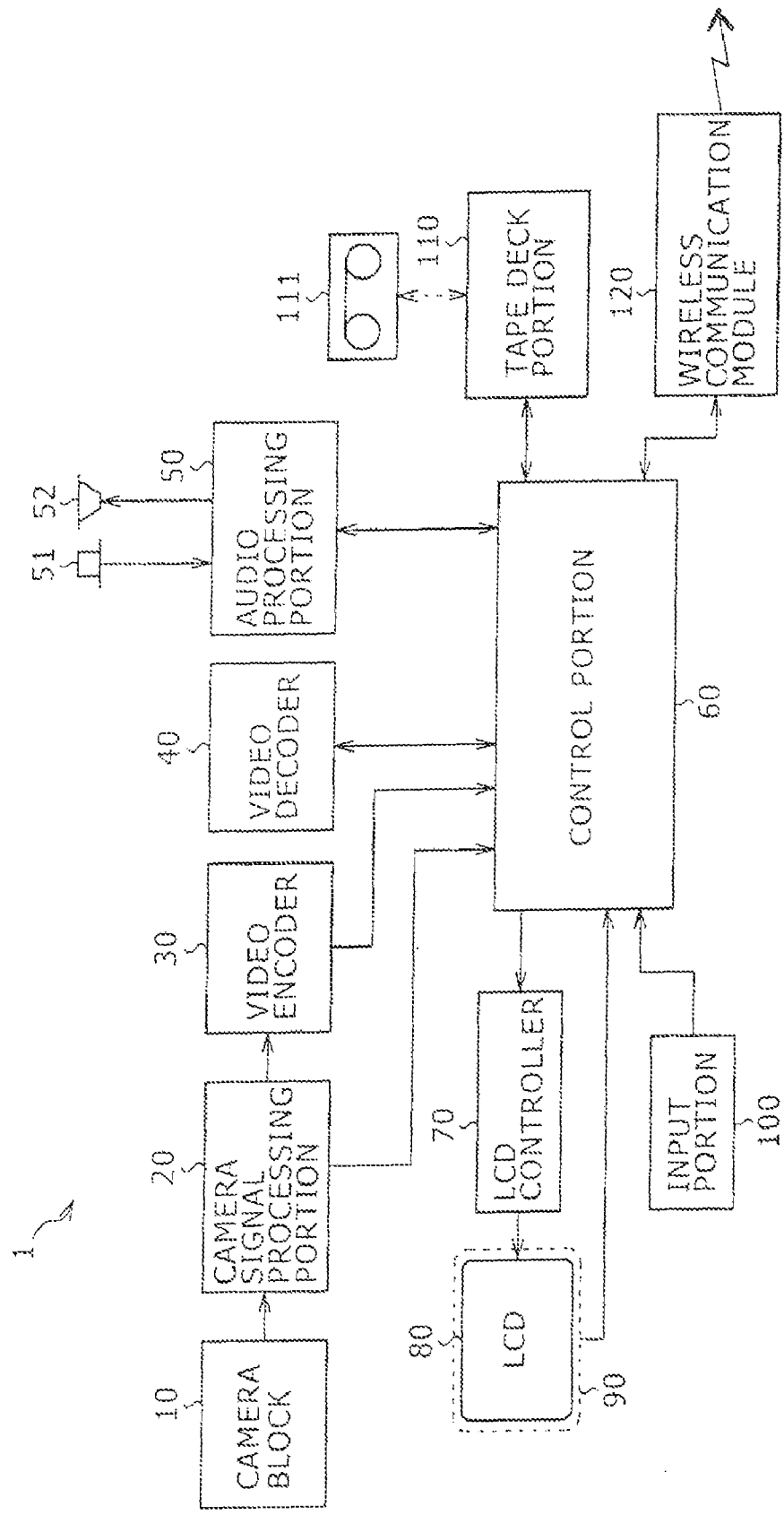
FIG. 1 is a block diagram showing an internal structure of a digital video camera according to one embodiment of the invention.

Hereinafter, there will be described one embodiment of the invention, by referring to the drawings. In the description below, an imaging apparatus according to the present invention takes the form of a digital video camera.

Figure 2:
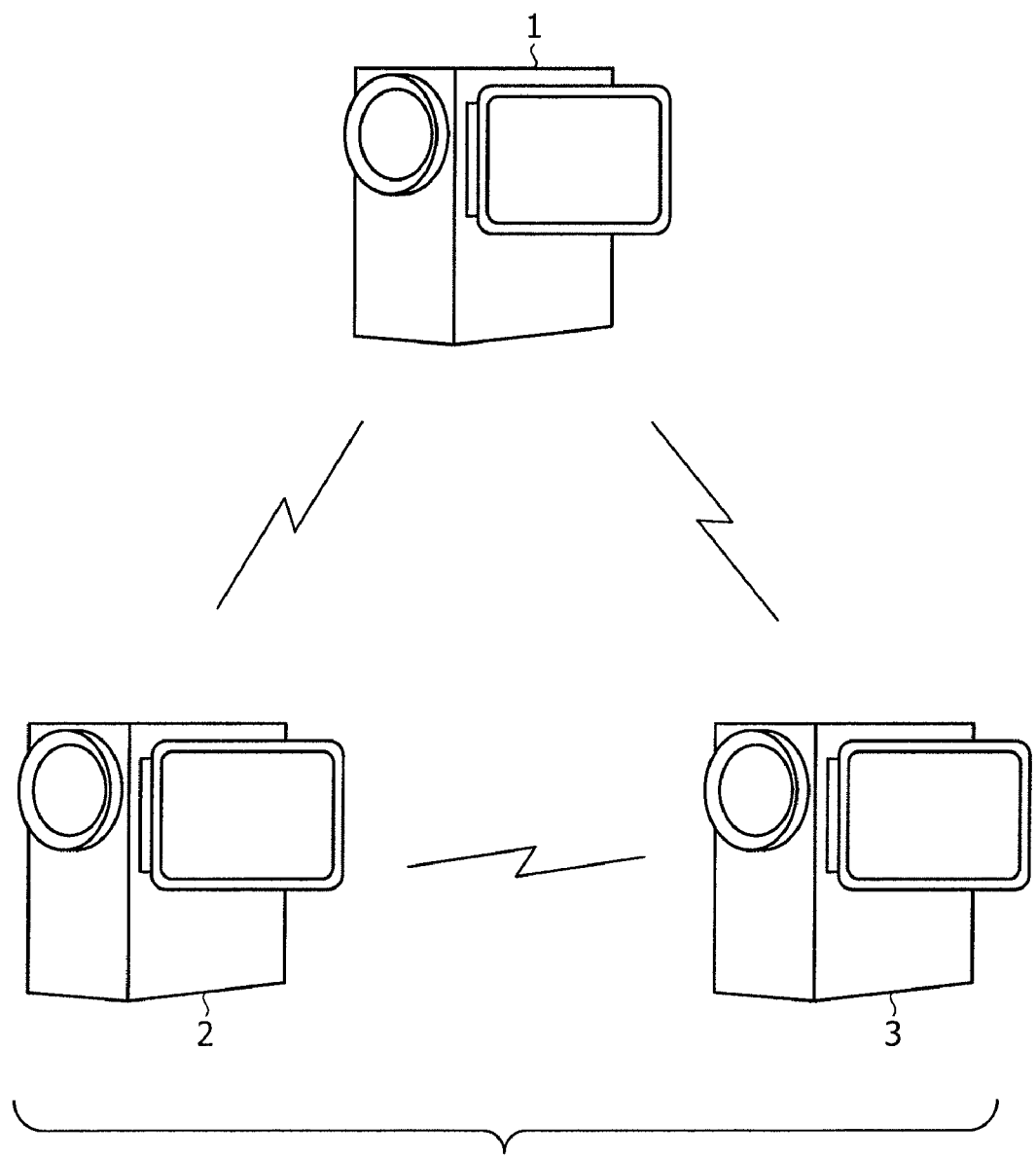
FIG. 2 shows a structure of a camera system comprising a plurality of the digital video cameras according to the embodiment of the invention.

FIG. 2 shows a structure of a camera system including a plurality of the digital video cameras each according to the embodiment of the invention.

As shown in FIG. 2, in the present embodiment, it is assumed that the invention is applied to a camera system comprising a plurality of digital video cameras 1-3 each capable of taking an image and recording the image in the form of digital data in a recording medium, as shown in FIG. 2. The digital video cameras 1-3 are capable of data transfer thereamong by wireless communications. Each of the digital video cameras 1-3 has a function to transmit data of an image which the digital video camera has taken, and a function to receive data of an image taken by any one of the other imaging apparatuses. Further, each digital video camera 1-3 can select an image among an image the digital video camera has taken and at least one image received from respective at least one other imaging apparatus, and record the selected image in a recording medium.

Such a camera system may be applicable in situations such as athletic meet, a venue of a sport game, wedding ceremony, and party, where a plurality of spectators or participants carry respective digital video cameras 1-3. In these situations, each of the digital video cameras 1-3 can selectively record an image taken by the video camera itself or an image received from one of the other video cameras, giving the effect that each user enjoys enhancement in the content of the recorded image, and less suffers from missing shooting opportunities.

Although three digital video cameras 1-3 are provided in the example shown in FIG. 2, the present camera system is applicable to a case where two or more digital video cameras are used.

FIG. 1 is a block diagram showing an internal structure of a digital video camera according to the embodiment of the invention. FIG. 1 representatively illustrates the internal structure of the digital video camera 1, and the other digital video cameras 2 and 3 have the same internal structure.

As shown in FIG. 1, the digital video camera 1 comprises a camera block 10, a camera signal processing portion 20, a video encoder 30, a video decoder 40, an audio processing portion 50, a control portion 60, an LCD controller 70, an LCD 80, a touch panel 90, an input portion 100, a tape deck portion 110, and a wireless communication module 120.

The camera block 10 comprises: an optical block including a plurality of lenses; an imaging element such as CCD (Charge Coupled Device); a preprocessing circuit; drivers for the optical block, the CCD, and others; a timing generation circuit; and others (none shown). The camera block 10 performs a photoelectric conversion for light incident on the optical block by means of the imaging element, and further implements sample/hold and AGC (Auto Gain Control) processing, by means of the preprocessing circuit. The obtained signal is then subjected to an A/D conversion to output digital image data. The operation of the optical block and the imaging element is controlled based on control signals from the control portion 60.

The camera signal processing portion 20 implements, for the image data outputted from the camera block 10, various kinds of camera signal processings such as an AWB (Auto White Balance) processing, an AF (Auto Focus) processing, and an AE (Auto Exposure) processing. The image data as has been subjected to the various kinds of processings is outputted to the video encoder 30 and the control portion 60.

The video encoder 30 encodes or compresses the image data as has been subjected to the camera signal processings, into a predetermined video data format such as MPEG (Moving Picture Experts Group) format, and the encoded image data is supplied to the control portion 60.

The video decoder 40 implements decompression or decode processing for the image data received from the control portion 60, and supplies the decoded image data to the control portion 60.

The audio processing portion 50 comprises an amplifier, an A/D converter, a D/A converter, a circuit for compression or encode processing and decompression or decode processing, and others. To the audio processing portion 50, there are connected a microphone 51 and a speaker 52. The audio processing portion 50 amplifies and converts a signal representative of audio collected through the microphone 51 into a digital signal, and further compresses or encodes the digital signal into a predetermined audio data format such as MPEG-AUDIO. The encoded signal is outputted to the control portion 60. An external input terminal for an analog audio signal may be additionally provided so that a signal inputted through the external input terminal is compressed or encoded by the audio processing portion 50 and the encoded signal is supplied to the control portion 60. The audio processing portion 50 decompresses or decodes the encoded audio data supplied from the control portion 60 and converts the decoded data into an analog signal which is amplified and played, that is, outputted from the speaker 52.

The control portion 60 is constituted by a microcomputer which generally controls the digital video camera 1, and is configured such that a CPU, a RAM, and a ROM (none shown) for instance, are connected to one another through a system bus. The control portion 60 outputs a control signal for controlling each functional portion of the digital video camera 1 by the CPU executing a program stored in the ROM, which may be constituted by a flash EEPROM (Electrically Erasable Programmable ROM), for instance. The RAM which may be constituted by a DRAM (Dynamic RAM) is mainly used as a working space for the CPU and functions to temporarily store an intermediate processing result, for example.

The LCD controller 70 generates an image signal from the image data supplied from the control portion 60, and supplies the image signal to the LCD 80 to present the image thereon. The LCD 80 has the touch panel 90. The user can input information by pressing the touch panel 90 with a finger or an instructing tool. Additionally, the input portion 100 comprises various buttons, levers, dials, and/or others. When some information is inputted through the touch panel 90 and/or the input portion 100, a control signal is outputted therefrom to the control portion 60.

A video cassette 111 incorporating a magnetic tape as a recording medium for recoding image and audio data is loaded into and ejected from the tape deck portion 110. The tape deck portion 110 modulates the image data, audio data and/or other data as supplied from the control portion 60, and the modulated data is written onto the magnetic tape in the video cassette 111. The signal read from the magnetic tape is demodulated to be supplied to the control portion 60.

The wireless communication module 120 comprises: an antenna for signal transfer using a signal modulation method such as OFDM (Orthogonal Frequency Division Multiplexing); an RF transceiver; a processor for implementing baseband processing, interface processing for the control portion 60, and other processings; and others. The wireless communication module 120 makes wireless communication with an external digital video cameras 2, 3 in accordance with a communication procedure controlled by the control portion 60. As communications standards, a wireless LAN defined by IEEE (Institute of Electrical and Electronic Engineers) 802.11g is employed, for instance.

There will be described a basic operation of the digital video camera 1.

When an image taken by the digital video camera 1 is to be recorded, light from an object is subjected to a photoelectric conversion by the imaging element of the camera block 10 and preprocessing is implemented to obtain digitized image data which is inputted to the camera signal processing portion 20, before the recording is started. The image data having been subjected to the camera signal processings is inputted to the LCD controller 70 via the control portion 60. Thus, an actual image captured by the camera block 10 is presented on the LCD 80.

When an instruction to start image recording is inputted in this state through the input portion 100, the taken image data is sent from the camera signal processing portion 20 to the video encoder 30 in which the data is compressed or encoded, and converted into a predetermined video format, and then inputted in the form of a video stream to the control portion 60. On the other hand, the audio signal collected through the microphone 51 is compressed or encoded by the audio processing portion 50, and converted into data in a predetermined audio format, and then inputted in the form of an audio stream to the control portion 60. The video stream and the audio stream are multiplexed by the control portion 60, outputted to the tape deck portion 110, modulated in accordance with a predetermined method, and then sequentially recorded on the magnetic tape in the video cassette 111.

To play the data recorded in the video cassette 111, the data is read by the tape deck portion 110, and separated into a video stream and an audio stream by the control portion 60. The video stream is decompressed or decoded by the video decoder 40, and inputted to the LCD controller 70 via the control portion 60. Thus, the image is played on the LCD 80. On the other hand, the audio stream is decompressed or decoded by the audio processing portion 50, and played or outputted in the form of sound from the speaker 52.

When the taken image is to be transmitted to each of the other digital video cameras 2, 3, the image data outputted from the camera signal processing portion 20 is inputted to the wireless communication module 120 via the control portion 60, and transmitted wirelessly in accordance with a predetermined communications procedure.

When an image taken by and wirelessly transmitted from each of the other digital video cameras 2, 3 is received by the wireless communication module 120, the received data is inputted to the control portion 60, and a video stream is separated therefrom. The video stream is decompressed or decoded by the video decoder 40 to obtain decoded image data which is outputted to the LCD controller 70 via the control portion 60. The image as received by the LCD controller 70 is presented on the LCD 80. The video stream separated in response to the input made through the input portion 100 or the touch panel 90 is outputted to the tape deck portion 110 via the control portion 60, and recorded on the magnetic tape in the video cassette 111.

It is possible to record an audio which is received by the wireless communication module 120 along with an image. However, in the present embodiment, audio data compressed or encoded by the audio processing portion 50 is always recorded on the magnetic tape.

The digital video camera 1 receives an image taken by each of the other digital video cameras 2, 3 by the wireless communication module 120, and concurrently presents the thus received images and an image taken by the camera block 10 on the LCD 80 in a composite manner, so as to enable the user to select a desired image to be recorded in the video cassette 111. Hereinafter, there will be described in detail this operation.

Figure 3:
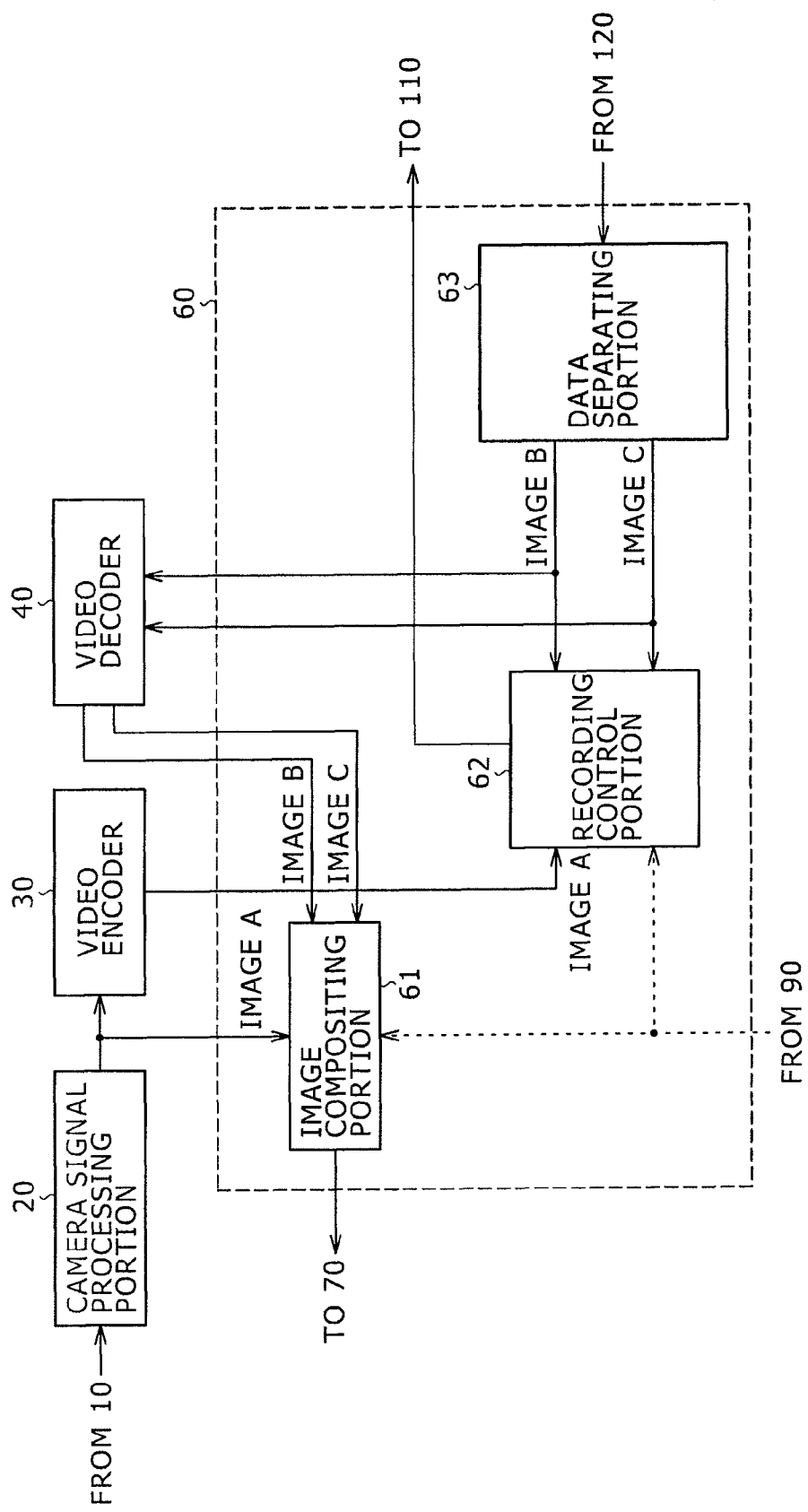
FIG. 3 is a block diagram of a function in a control portion, which selects an image among images taken by an imaging apparatus and images respectively received from the other imaging apparatuses, and recording the selected image.

FIG. 3 is a block diagram showing a function of the control portion 60 which implements the recording of an image selected among an image taken by a digital video camera and images received from the other digital video cameras. In the following description, the images taken by the digital video cameras 1, 2 and 3 will be respectively referred to as an image A, an image B, and an image C.

As shown in FIG. 3, the control portion 60 comprises an image compositing portion 61 for presenting a composite image, a recording control portion 62 for selectively recording an image, and a data separating portion 63 for extracting an image signal from a received signal.

To the image compositing portion 61, there are inputted data of an actual image captured by the camera block 10 (image A) from the camera signal processing portion 20, and data of images B and C as decompressed or decoded by the video decoder 40. The image compositing portion 61 generates a composite image where these inputted images are presented on a single screen, and the composite image is outputted to the LCD controller 70. In this composite image, an image selected to be recorded in accordance with an instruction inputted through the touch panel 90 is presented in a size largest among all the images presented, and the other images are presented in a smaller size in a child screen or a divisional screen, as described later.

To the recording control portion 62, there are inputted the data of the image A as compressed or encoded by the video encoder 30, and the data of the images B and C as separated from the received signals by the data separating portion 63. The recording control portion 62 outputs to the tape deck portion 110 the data of the image selected among the three images in accordance with a control signal from the touch panel 90, so as to have the outputted data recorded on the magnetic tape in the video cassette 111.

The data separating portion 63 separates the data of the images B and C from the signals respectively transmitted from the digital video cameras 2 and 3 and received by the wireless communication module 120, and the separated data is outputted to the recording control portion 62 and the video decoder 40.

Where communication is established among the digital video cameras 1-3 through wireless LAN, the cameras make communication in the "ad hoc mode" where an access point is not involved. In this case, an image taken by a digital video camera is transmitted to one or more digital video cameras by using a single communications channel. Hence, when the digital video camera 1 receives the images B and C from the digital video cameras 2 and 3, a communication using an individual communications channel for each of the images is made. The data separating portion 63 recognizes received packets of each communications channel, and extracts data of each image B, C.

The data of the respective images B and C as separated by the data separating portion 63 is decompressed and encoded by the video decoder 40, and inputted into the image compositing portion 61. In this way, where a plurality of images are received through wireless communication, images of a plurality of channels should be decompressed or decoded. To serve this purpose, there may be provided a plurality of video decoders 40 corresponding to the number of images to be received, so as to respectively decompress or decode the images, for instance. Alternatively, only one video decoder 40 may be provided to operate to decompress or decode each of the images in a time division manner.

Figure 4:
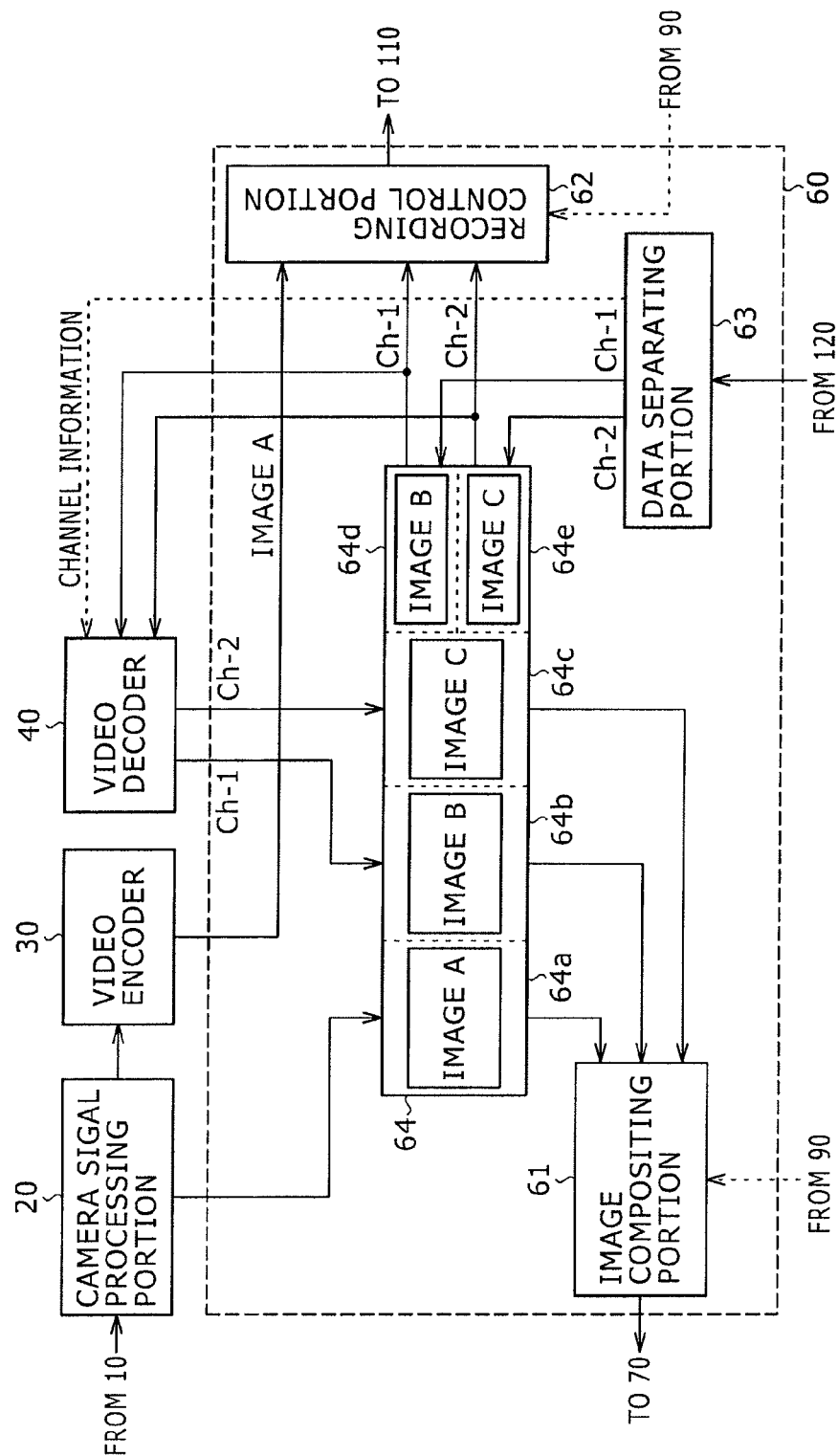
FIG. 4 illustrates decode processing using a video decoder.

FIG. 4 illustrates how the video decoder 40 implements decompression or decode of image data.

In this embodiment, the RAM in the control portion 60 is used as a buffer 64 for temporarily storing image data. The buffer 64 has areas 64a-64c in which the data of the respective images A-C not yet compressed or encoded are respectively stored, and areas 64d and 64e in which the data of the respective images B and C as has been compressed or encoded are stored. These buffer areas may be provided, for instance, by a frame memory (not shown) connected to each of the camera signal processing portion 20, the video encoder 30, and the video decoder 40.

The data separating portion 63 sequentially separates the data of the respective images B and C from the received packets, and writes the separated data to the areas 64d and 64e. Further, the data separating portion 63 outputs to the video decoder 40 channel information including the number of channels corresponding to that of the images received, and channel IDs used for identifying the channels through which images are transmitted, for instance. In this embodiment, channel IDs "Ch-1" and "Ch-2" are respectively allocated for the images B and C, for example.

Based on the channel information notified, the video decoder 40 determines which area in the buffer 64 certain image data is to be read from or written to. When two channel IDs are notified as the channel information, processings for the channel of the ID "Ch-1" is first implemented, namely, the data of the image B is first read from the area 64d and decompressed or decoded, and the decoded data is written to the area 64b. Then, processings for the channel of the ID "Ch-2" is implemented, namely, the data of the image C is read from the area 64e and decompressed and encoded, and the encoded data is written to the area 64c. The processings for the two channels are alternately implemented by a predetermined number of pixels, and the decompression or decode processings for the respective two channels corresponding to the images B and C are implemented in parallel.

Figure 5:
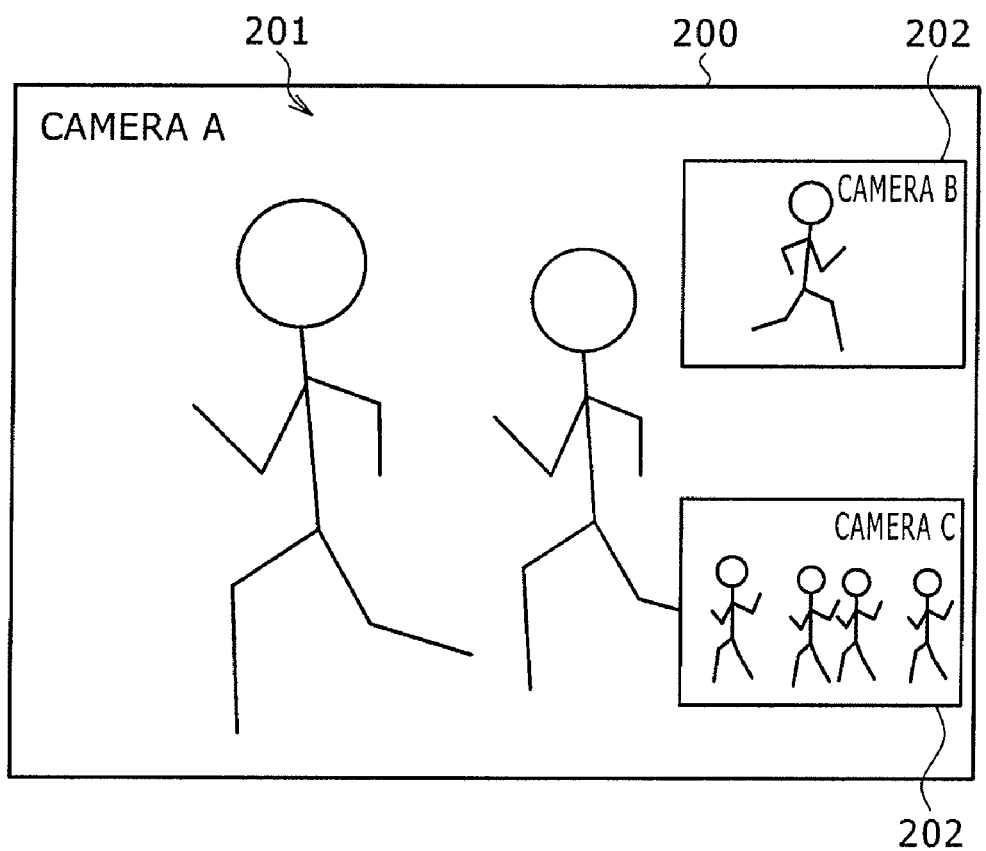
FIG. 5 shows an example of a form of a screen where an image taken by an imaging apparatus and images taken by the other imaging apparatuses are presented in a composite manner.

There will be now described how an image is generated by the image compositing portion 61 and presented on the LCD 80. FIG. 5 shows an example of a form of a screen where an image taken by an imaging apparatus and images taken by other imaging apparatuses are presented as composited.

When a first one of the digital video cameras which is taking an image receives images from the other digital video cameras, the image compositing portion 61 of the first digital video camera generates a composite image where all the images are concurrently presented. The composite image is presented on the LCD 80 of the first digital video camera, and the user of the first digital video camera can select an image to record, by manipulating or touching the LCD 80 at a corresponding place in the presented composite image. For instance, a display composite image 200 as shown in FIG. 5 comprises a parent screen 201 and two child screens 202 and 203.

The image currently selected to be recorded is presented in the parent screen 201, and the images currently not selected are presented in the child screens 202 and 203. When the user manipulates the touch panel 90 or touches the child screen 202 or 203 in the touch panel 90, the image of the selected child screen 202 or 203 is recorded, and the image currently presented in the parent screen 201 is replaced by the image of the selected child screen. Hence, the user can view at once all the images recordable by viewing the display composite image 200, and select an image to record.

The composite image made of the images A, B and C is not limited to the one as described above. For instance, the screen may be divided into a plurality of sections in which the images A, B and C are respectively presented. Further, it may be adapted such that the when an image is selected, the places or screens where the images are presented do not change, but the selected image is explicitly indicated in some way, for instance, a color of a frame of the screen in which the selected image is presented is changed. In this case, the image taken by the first digital video camera may be always presented in the largest size.

Figure 6:
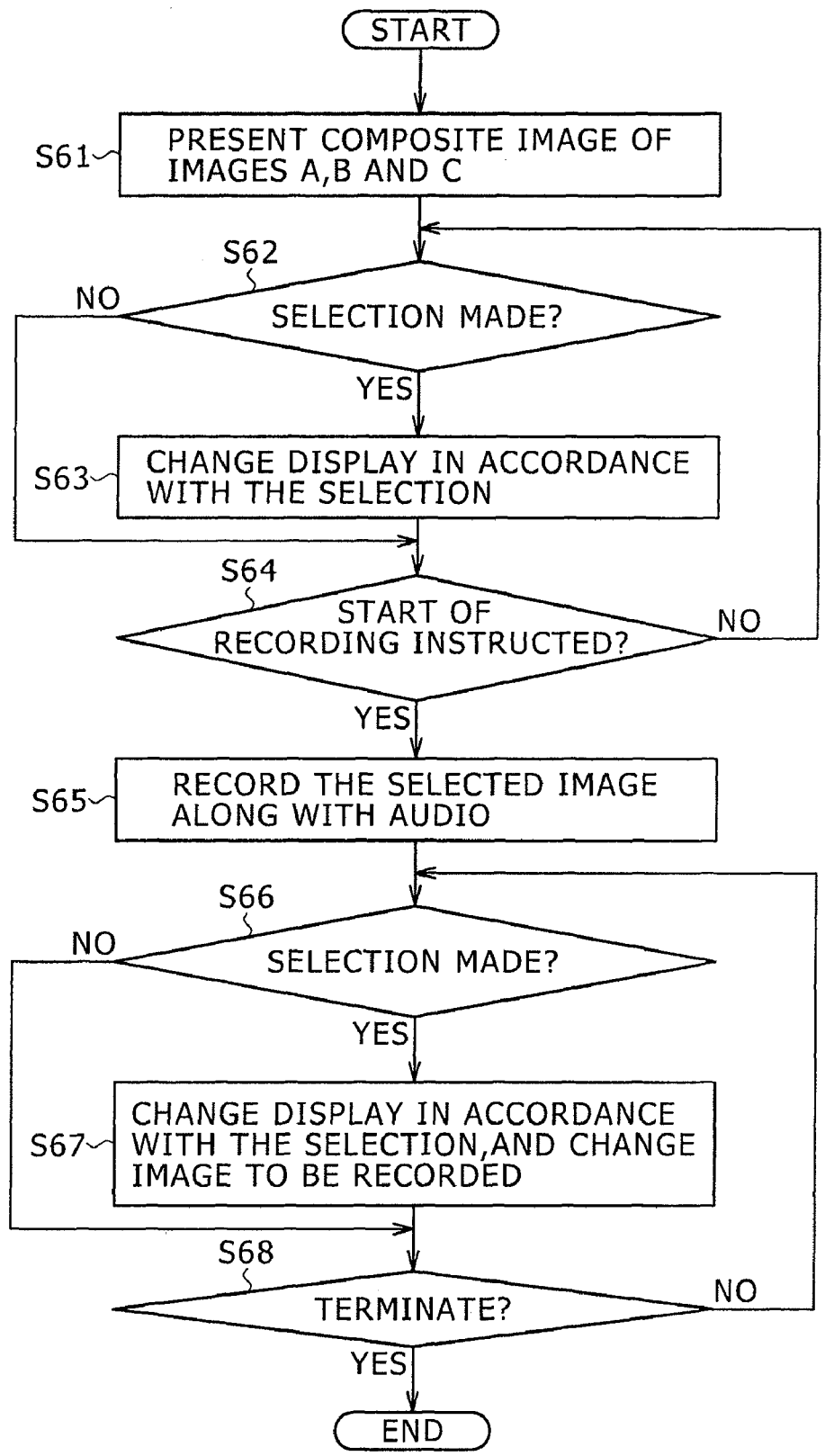
FIG. 6 is a flowchart illustrating processing for selecting an image among an image taken by an imaging apparatus and images respectively taken by the other imaging apparatuses, and recording the selected image.

There will be described processing implemented when the above-described image recording is performed, by referring to a flowchart of FIG. 6 illustrating the processing for selectively recording an image among the image taken by the first digital video camera and the images received from the other digital video cameras.

In step S61, the images A, B and C are presented on the LCD 80 in the composite manner. When the structure shown in FIG. 4 is employed, the data of the image A as outputted from the camera signal processing portion 20 is sequentially written to the area 64a of the buffer 64. The data of the images B and C from the digital video cameras 2 and 3 are decompressed or decoded by the video decoder 40, and the respective decoded data are sequentially written to the areas 64b and 64c. The image compositing portion 61 controls the area in the buffer 64 from which data is read, and synthesizes the images. For instance, by default the selected image is the image A taken by the first digital video camera, and thus the image A is presented in the parent screen 201.

In step S62, it is determined whether a selection of image is made through the touch panel 90, based on the presence/non-presence of the control signal from the touch panel 90. When it is determined that a selection is made, the flow goes to step S63, but when it is determined that a selection is not made, the flow goes to step S64.

In step S63, the image compositing portion 61 changes the screen display of the LCD 80 in accordance with the selection made in step S62. When the display composite image 200 as shown in FIG. 5 is currently presented, the area in the buffer 64 from which data is read is controlled so as to present the selected image in the parent screen 201.

In step S64, it is determined whether a manipulation to instruct to start recording is made, based on a control signal from a predetermined switch disposed in the input portion 100, or a control signal sent from the touch panel 90 in response to an operation of or a touch on a switch button presented on the LCD 80. When it is determined that the manipulation is made, the flow goes to step S65, and when it is determined that the manipulation is not made, the flow returns to step S62.

In step S65, data of the currently selected image is recorded along with audio data from the audio processing portion 50, on the magnetic tape of the video cassette 111. The audio data recoded is not limited to the data from the audio processing portion 50. For instance, it may be adapted such that audio data is received from another digital video camera along with image data and the audio data is recorded. Alternatively, where another recording medium such as a portable semiconductor memory is loaded into the first digital video camera, audio data recorded in this recording medium may be read and recorded on the magnetic tape.

In step S66, it is determined whether a selection of an image is made, similarly to step S62. When it is determined that a selection is made, the flow goes to step S67, and when it is determined that a selection is not made, the flow goes to step S68.

In step S67, the image compositing portion 61 changes the screen display of the LCD 80, based on the selection made in step S66. At the same time, the recording control portion 62 switches the input of image data, so as to have the tape deck portion 110 record the selected image. It is noted that switching in the audio data is not made at this time, but the audio data currently being recorded is continuously recorded.

In step S68, it is determined whether the recording is to be terminated, based on presence/non-presence of a control signal from the input portion 100 or the touch panel 90, and when the recording is not to be terminated, the flow returns to step S66.

Where a plurality of the digital video cameras constructed as described above are present, each digital video camera can record on a magnetic tape an image selectively among an image that the each digital video camera takes, and an image taken by each of the other digital video camera(s) and received therefrom through wireless communication. Hence, the user of each digital video camera can effectively utilize the images taken by the digital video cameras and enrich the content of the recorded image, while less missing shooting opportunities. Since the recordable images are presented on the LCD 80 at once and in a composite manner so that the user can select an image to record as desired, the user can select a desired image while viewing all the images, enhancing the user-friendliness.

The audio data of a single channel from the audio processing portion 50 or others is kept recorded, irrespective of the image selected. Thus, while the recorded image is played, there is ensured continuity in audio upon switching of the images, which would be otherwise deteriorated to annoy a viewer. Thus, the quality of the recorded content is enhanced.

Although data of any one of the images A, B and C is recorded on the magnetic tape in the digital video camera 1, it may be adapted such that data of the composite image made of there images A-C is recorded. Where the data of the composite image is recorded, it may be adapted such that the relative position among the images in the composite image is easily changeable in accordance with a selection made through an operation or manipulation of the touch panel 90 or others, and in the digital video camera the data of the composite image generated by the image compositing portion 61 is outputted to the video encoder 30 which compresses or encodes the data so that the encoded data is outputted to the tape deck portion 110 to be recorded on the magnetic tape. Thus, it is required that the digital video camera be capable of compressing or encoding the images of at least two channels in parallel.

It may be adapted such that when an image received from a digital video camera is selected and recorded in another camera, the digital video camera as a sender of the image is notified, through wireless communication, that such a selection is made. In this case, the user of the sending digital video camera is apprised, by an indication, of the fact that the image taken by the sending digital video camera is being recorded by the another digital video camera. For instance, the indication is made such that a color of a frame of the image taken by the sending camera is changed on the LCD of that sending camera.

There will be described a modification of the embodiment described above. In the modification, an image recognition technology is used to determine whether a desired object is present in each recordable image, and the image to record is automatically selected based on the result of the determination.

Figure 7:
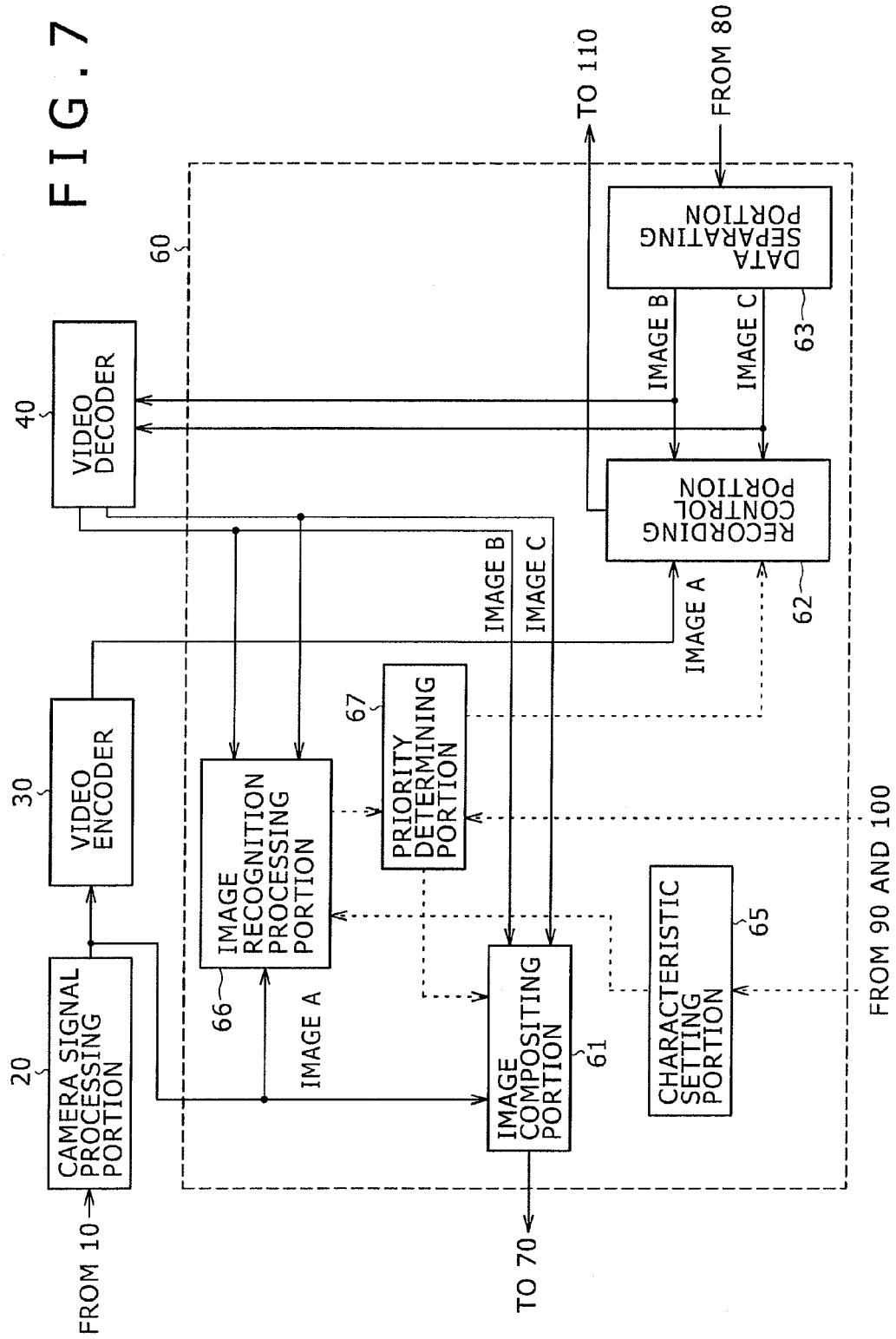
FIG. 7 is a block diagram of a function in the control portion, which automatically selects an image among an image taken by an imaging apparatus and images received from the respective other imaging apparatuses by using an image recognition technique, and recording the selected image.

FIG. 7 is a block diagram showing a function in the control portion 60 which automatically selects an image among an image taken by a digital video camera and images from the other digital video cameras, by an image recognition technique, and recording the selected image.

In the following description, a basic structure of a digital video camera according to a modification of the embodiment is the same as that shown in FIG. 1. Components corresponding to those of the digital video camera shown in FIG. 3 are denoted by the same reference numerals in FIG. 7.

As shown in FIG. 7, a control portion 60 of this digital video camera comprises a characteristic setting portion 65 for setting characteristics of an object, an image recognizing and processing portion 66 for recognizing in an image the object having the characteristics as set, and a priority determining portion 67 which notifies an image to be recorded in accordance with a priority setting, in addition to an image compositing portion 61, a recording control portion 62 and a data separating portion 63.

The characteristic setting portion 65 receives an input related to settings on characteristics of the object to be recognized in the image, and notifies the settings to the image recognizing and processing portion 66. For instance, the settings may be inputted by selecting the object of interest in an image presented on the LCD 80 by making a click or drag on the touch panel 90, or by inputting information such as a color of the object or other information on the object by using a predetermined switch in the input portion 100.

The image recognizing and processing portion 66 implements image recognition processing, based on the data of the image A from the camera signal processing portion 20 and the data of the images B and C as decompressed or decoded by the video decoder 40, and in accordance with the characteristic information notified by the characteristic setting portion 65, and notifies each image in which the object is present to the priority determining portion 67.

When notified of a plurality of images including the object, or when not notified of any images including the object, from the image recognizing and processing portion 66, the priority determining portion 67 notifies the image of the highest priority to the image compositing portion 61 and the recording control portion 62 based on information on a priority ranking inputted through the touch panel 90 or the input portion 100. The priority ranking is set as desired by the user inputting information thereon through the touch panel 90 or the input portion 100.

Figure 8A:
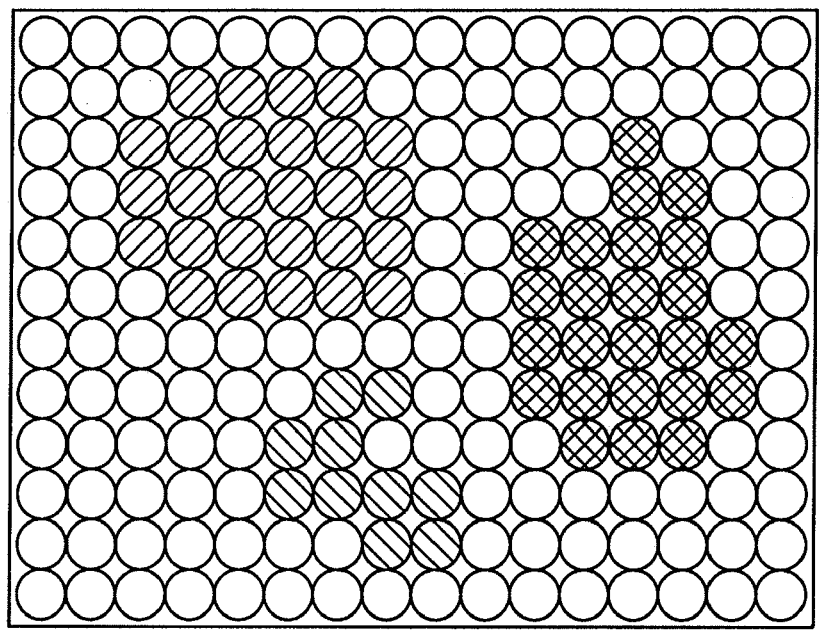
FIGS. 8A and 8B illustrate color recognition processing as an example of image recognition processing.
Figure 8B:
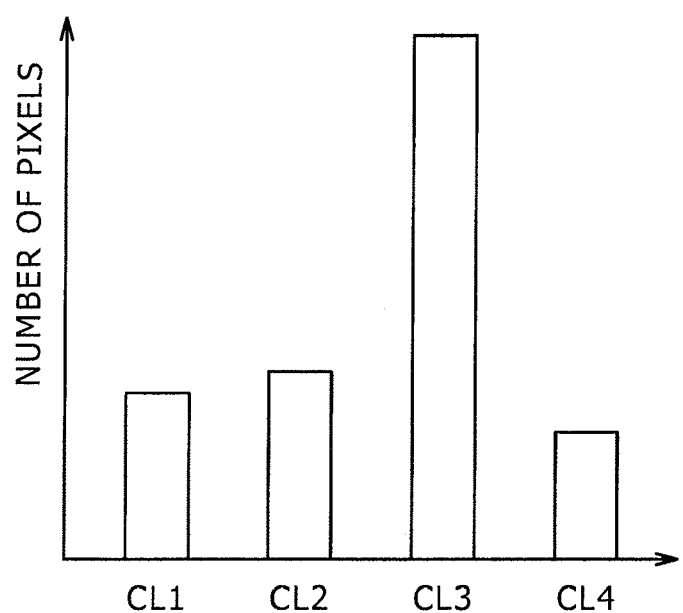

FIGS. 8A and 8B illustrate color recognition processing as an example of image recognition processing.

As image recognition processing that the digital video camera can implement, there is color recognition processing, for instance. In color recognition processing, a particular color uniquely found in the object of interest is used as the characteristic information, and whether this color is present in an image or not is determined. For instance, when an athlete in an athletic meet is the object to record, a ribbon of a peculiar color which is rarely present in the environment is put on the athlete, to make the color recognition processing feasible.

FIG. 8A schematically shows a part of a matrix of pixels for an image to process. This drawing shows an example where pixels of four colors CL1-CL4 are present at an area in the image. In this example, the image recognizing and processing portion 66 calculates or accumulates the number of pixels of each color in a given area based on color information for each pixel in an inputted image, and obtains a histogram as shown in FIG. 8B. Using this histogram, it can be determined whether the image should be recorded, based on the presence or absence of a pixel of the predetermined color, which is set beforehand as desired by the characteristic setting portion 65.

Other methods than the above-described method are applicable. For instance, the object is extracted from an image based on characteristic points in the figure of the object. A pattern recognition of human face is an example thereof, which may be implemented such that information on geometrical characteristics of a face of a personas the object (which includes, for instance, the shapes and locations of the eyes, mouth, nose, and others parts) is used, or the features of the face as a whole is captured as a common two-dimensional image with a density gradation. When an object-oriented coding technology is employed in encoding an image to recognize, the accuracy in extracting the object of interest is effectively enhanced.

Referring back to FIG. 7, when the object of interest is extracted from an input image, the image recognizing and processing portion 66 notifies the image to the priority determining portion 67. When notified of only one image, the priority determining portion 67 transmits the one image, which is not subjected to any processing, to the image compositing portion 61 as well as the recording control portion 62. Then, the image compositing portion 61 generates an image where the selected image is particularly featured, such as an image where the notified image is presented in the parent screen. The generated image is presented on the LCD 80. The recording control portion 62 selects the notified image and outputs that image to the tape deck portion 110 which records the image on the magnetic tape.

When notified of a plurality of images including the object of interest from the image recognizing and processing portion 66, the priority determining portion 67 selects an image of the highest priority among the notified images, based on the preset image priority ranking, and notifies the image of the highest priority to the image compositing portion 61 and the recording control portion 62. The priority ranking can be set by the user as desired. For instance, there may be applied a rule such that a camera near the object is prioritized, or such that a camera positioned at a good angle with respect to the object to take a better image than the other cameras is prioritized.

Where the object of interest can not be extracted from any images by the image recognizing and processing portion 66, an image selection may be made based on the preset priority ranking. There will be now illustrated how an image is selected based on the priority ranking, by way of three examples.

Figure 9:
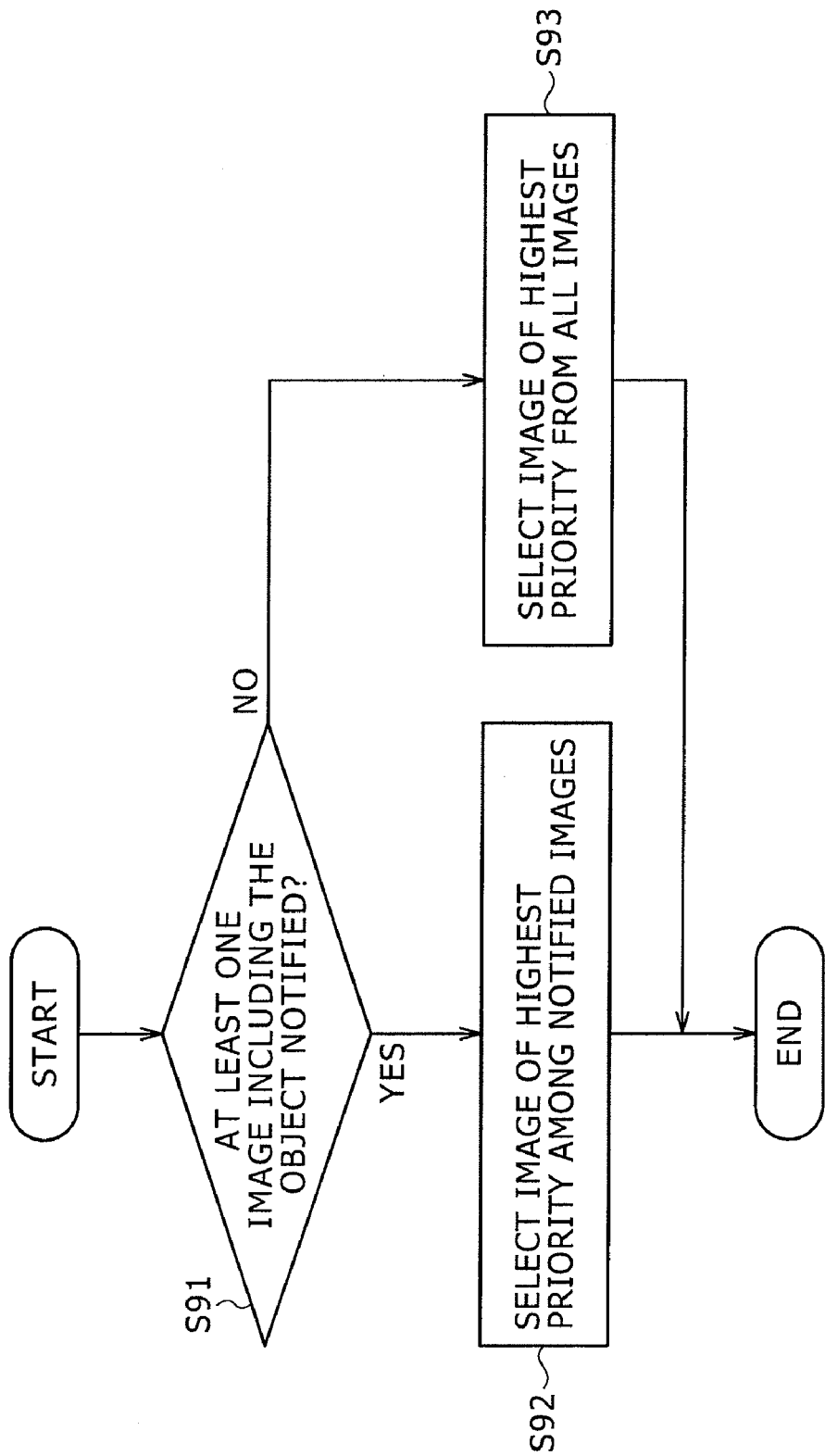
FIG. 9 is a flowchart illustrating processing according to a first image selecting method.

FIG. 9 is a flowchart illustrating processing in accordance with a first image selecting method.

In step S91, it is determined whether at least one image including the object of interest is notified to the priority determining portion 67 from the image recognizing and processing portion 66. When an affirmative decision is made, the flow goes to step S92. When it is determined that no image is notified, the flow goes to step S93.

In step S92, the priority determining portion 67 selects the preset highest priority image among the at least one notified image or images, and notifies the selected image to the image compositing portion 61 and the recording control portion 62, so that the selected image is recorded on the magnetic tape.

In step S93, the priority determining portion 67 selects the image of the highest priority from among all the images, and notifies the selected image to the image compositing portion 61 and the recording control portion 62, so that the selected image is recorded on the magnetic tape.

For instance, the above-described first image selecting method is suitable for a case where a camera which will take a principal image normally most often selected is known in advance, and switching to an image taken by any of the other cameras is rarely made, such as in baseball broadcast.

Figure 10:
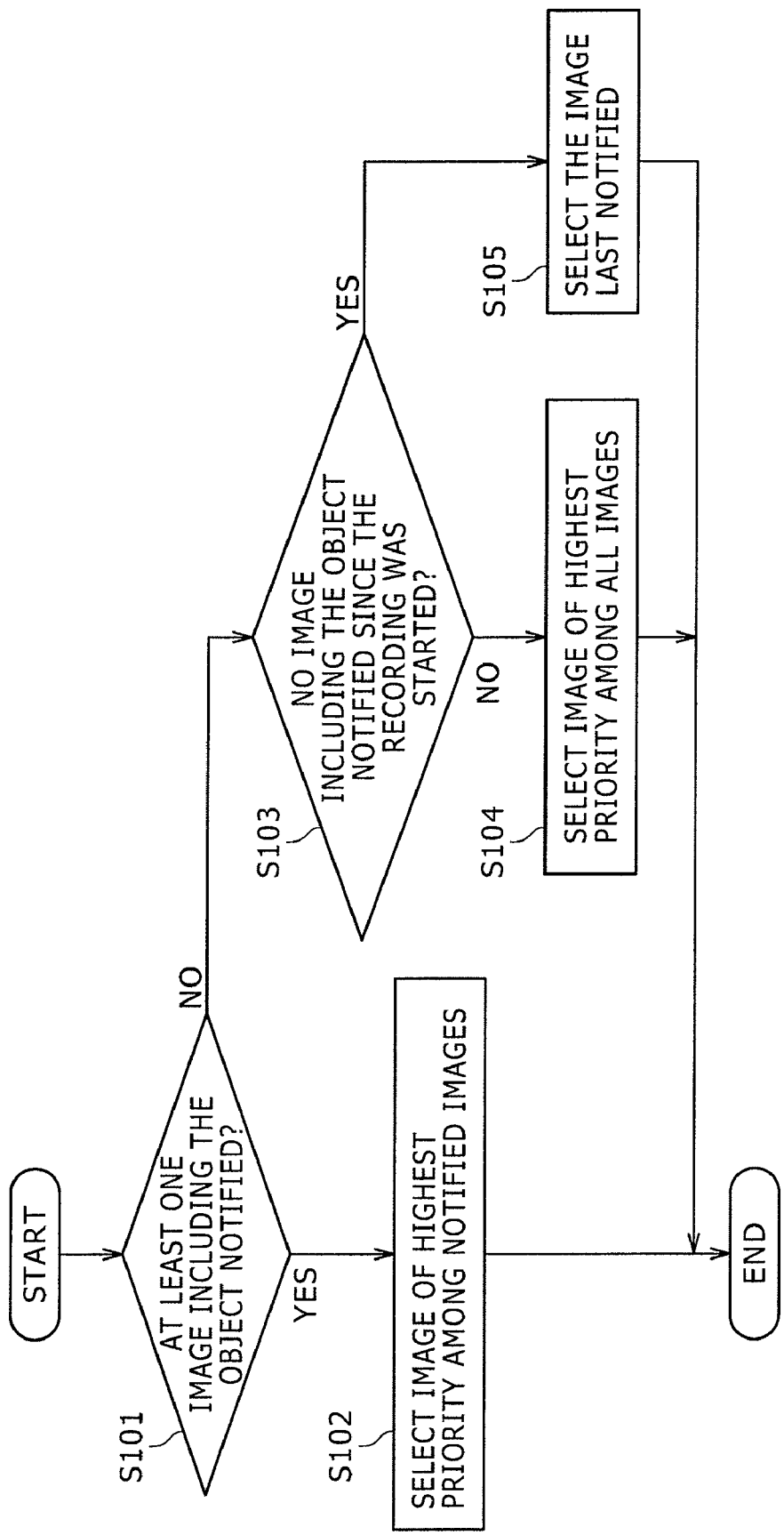
FIG. 10 is a flowchart illustrating processing according to a second image selecting method.

FIG. 10 is a flowchart illustrating processing in accordance with a second image selecting method.

Similarly to the flowchart of FIG. 9, in steps S101 and S102, it is determined whether at least one image including the object of interest is notified from the image recognizing and processing portion 66, and when an affirmative decision is made, the priority determining portion 67 notifies the image of the highest priority among the at least one notified image or images. When no image is notified in step S101, the flow goes to step S103.

In step S103, it is determined whether at least one image including the object of interest has been notified since the image stream in question was started. When no image has been notified, the flow goes to step S104, but when at least one image has been notified, the flow goes to step S105.

In step S104, the priority determining portion 67 selects an image of the highest priority among all the images, and notifies the selected image.

In step S105, the priority determining portion 67 selects, as an image to record, an image which has been notified and last selected, and notifies the selected image.

Figure 11:
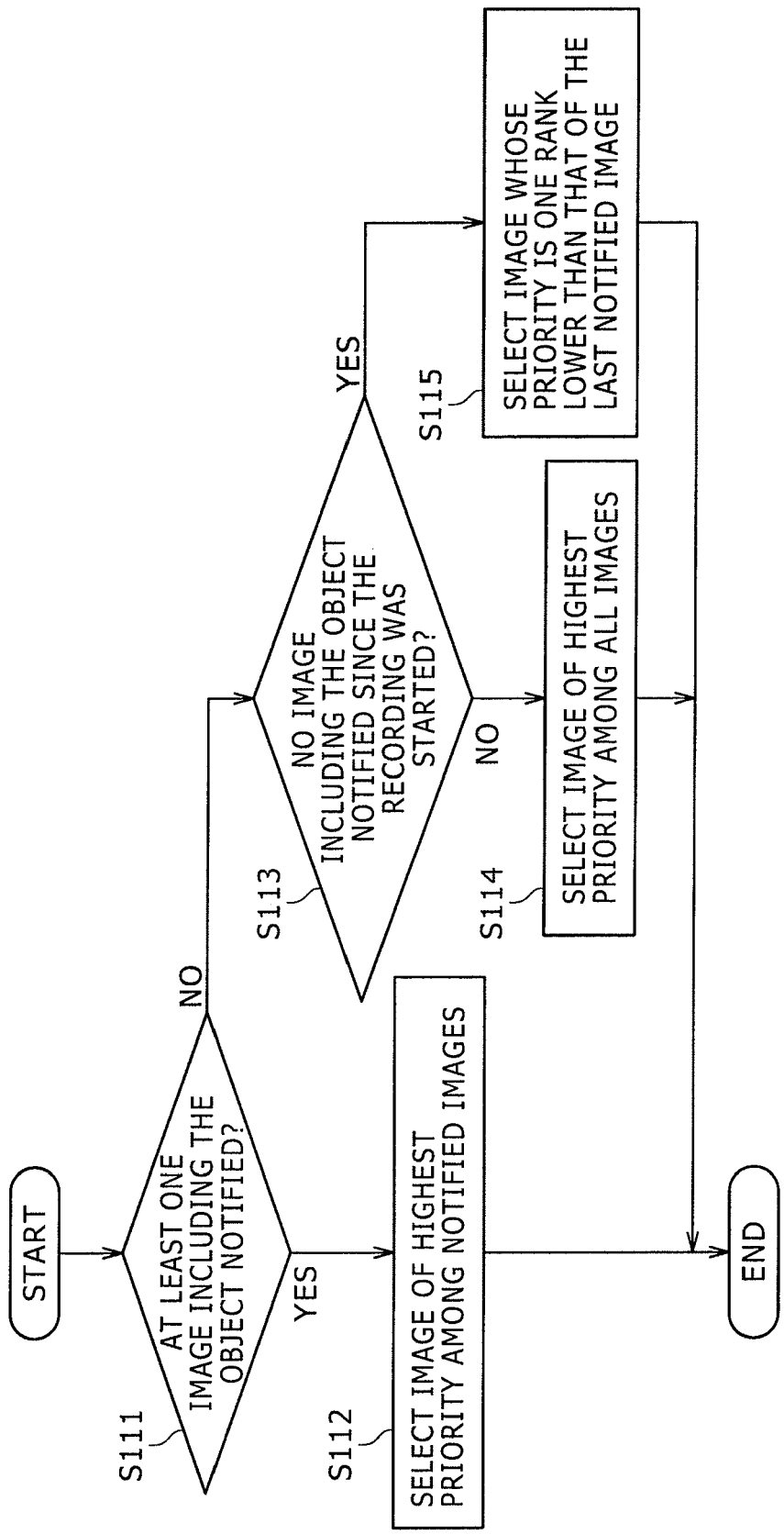
FIG. 11 is a flowchart illustrating processing according to a third image selecting method.

FIG. 11 is a flowchart illustrating processing in accordance with a third image selecting method.

Similarly to the flowcharts of FIGS. 9 and 10, in steps S111 and S112, it is determined whether at least one image including the object of interest is notified from the image recognizing and processing portion 66, and when an affirmative decision is made, the priority determining portion 67 notifies an image of the highest priority among the at least one notified image or images. When no image is notified in step S111, the flow goes to step S113.

Similarly to the flowchart of FIG. 10, in steps S113 and S114, it is determined whether at least one image including the object of interest has been notified since the image stream in question was started, and when no image has been notified, an image of the highest priority is selected from among all the images, and the selected image is notified, but when at least one image has been notified, the flow goes to step S115.

In step S115, an image one rank below the image which has been last notified and selected is selected as an image to record, and is notified.

Figure 12:
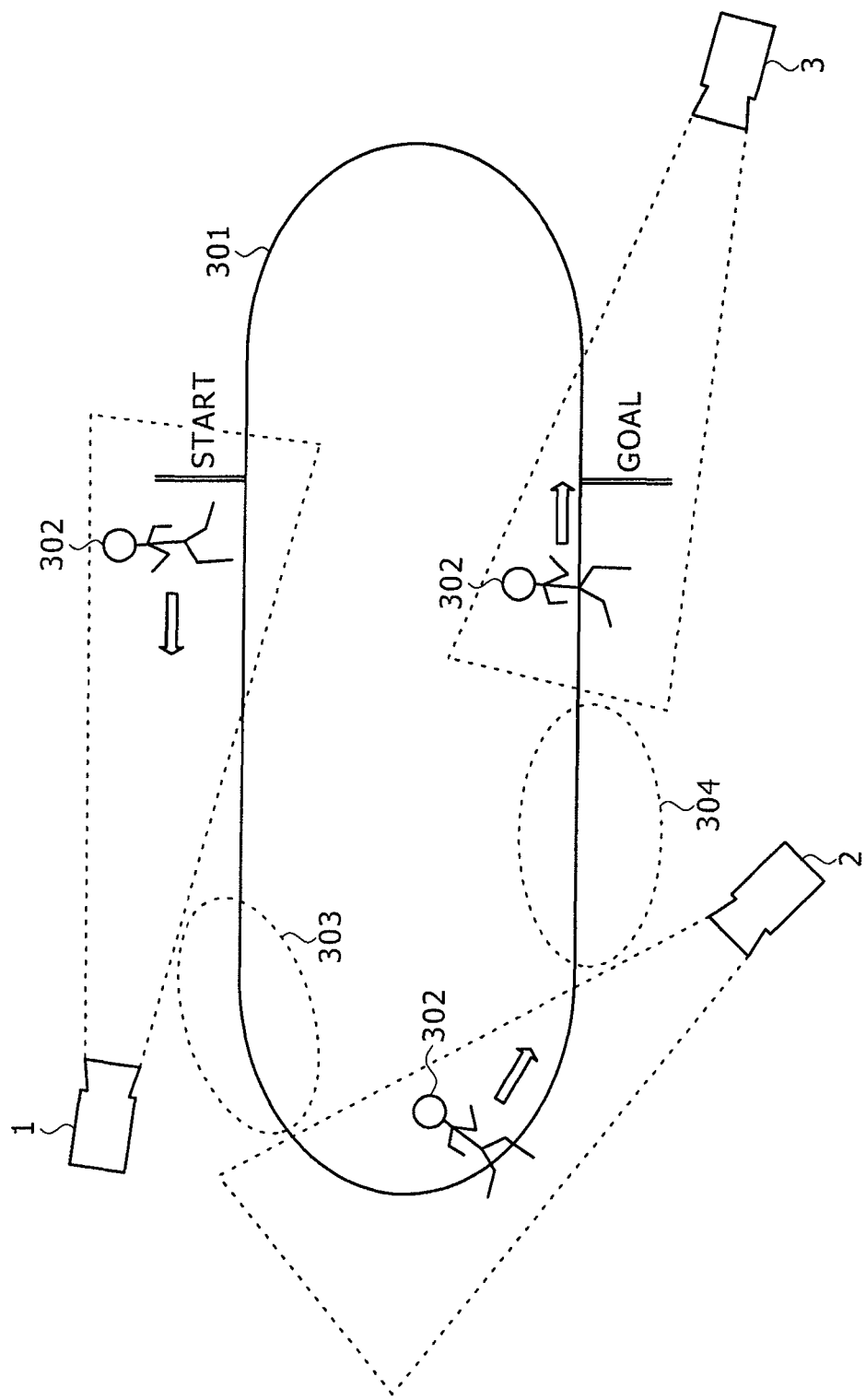
FIG. 12 shows an example of a setup of cameras when an image of a runner running along a track in a field is captured.

Effects obtained by employing each of the second and third image selecting methods will be described by referring to a case where an image of a runner running along a track in a field is captured, by way of example. FIG. 12 is a view illustrating an example of setup of cameras when the image of the runner in the track of the field is taken.

In the example of FIG. 12, in order to take an image of a runner 302 running along a track 301 in a field, a video camera system comprising three digital video cameras 1-3 is employed. The digital video cameras 1-3 take images of respective places in the track 301, namely, a starting line and therearound, an intermediate portion, and a finish line and therearound. However, none of the three digital video cameras 1-3 can take an image of an entirety of the track 301, and there are left areas 303 and 304 not included in any taken images, between areas shot by the cameras. Hence, during the image of the runner 302 is captured between the moment the runner starts running and the moment the runner crosses the finish line, there is a time period during which the runner does not appear on any screens of the cameras.

In general, when the method shown in FIG. 9 where the highest priority image is selected is employed in a case where an object of interest can not be recognized in any images taken by the digital video cameras 1-3, each time the object of interest becomes unrecognizable, the selected image is switched back to the image taken by the most highly prioritized digital video camera, resulting in unnatural shifting of the scene. Hence, this method is not suitable for the situation of FIG. 12.

On the other hand, according to the second image selecting method shown in FIG. 10, in a case where the object of interest is not currently recognized in any taken images, but the object has been recognized at least once since the recording was started, the image as has been selected last is selected, and thus the selected image is not unnaturally repeatedly switched back to the image taken by a same digital video camera during the image is taken.

Let us consider the case where an image is taken in the situation of FIG. 12. When the runner 302 starts running, the runner 302 is initially recognized in the image taken by the digital camera 1, and this image is selected. Then, upon entering the area 303, the runner 302 becomes unrecognizable in any images, but the processing of step S105 in FIG. 10 keeps selecting the image taken by the digital video camera 1. Thereafter, the runner 302 is again recognized in an image taken by the digital video camera 2, and thus this image is selected. Hence, it does not occur that an image of the starting line is unnaturally inserted in the image of the running runner 302 as recorded. Accordingly, the scene of the created image content keeps, shifting smoothly.

On the other hand, in the third image selecting method as shown in FIG. 11, where the object of interest is not recognized in any taken images, but has been recognized at least once since the start of the recording, an image one rank below the image which has been last selected is selected. Hence, like in the second image selecting method, it does not occur that the image taken by the digital video camera of the highest priority is unnaturally inserted.

Let us consider the case where an image is taken in the situation of FIG. 12 with the digital video cameras 1, 2 and 3 prioritized in this order. Initially, an image of the runner 302 who starts running is taken by the digital video camera 1. Then, when the runner 302 enters the area 303, the selected image is switched to the image taken by the digital video camera 2 which is second prioritized. After this switching, the runner 302 appears in the image to which the selected image has been switched. Then, the runner reaches the area 304, and the selected image is switched to the image taken by the digital video camera 3. Thereafter, the runner 302 appears in the image to which the selected image has been switched, in the similar way as described above. Thus, switching among the images is along the direction in which the runner 302 moves, making the switching natural. Accordingly, the quality of the created moving image content is improved.

As described above, each of the digital video cameras is provided with the function to extract the object from the image taken by the each digital video camera as well as from the images taken by the other digital video cameras, by image recognition technique, and automatically select the image from which the object is extracted to record the selected image. Thus, the user can record an image of an enhanced content while concentrating on taking an image without viewing the images received from the other digital video cameras.

The above-described embodiment is an application of the invention to a digital video camera. However, the invention is applicable to other imaging apparatuses such as digital still camera (especially one having a video capturing function). Further, the recording medium in which the selected image is to be recorded is not limited to the video cassette, but may be a portable semiconductor memory, or a disk recording medium such as hard disk and optical disk, for example.

The invention is applicable to an image recording apparatus not having an imaging function. For instance, a video recorder or other apparatuses using a disk recording medium such as hard disk and optical disk, may be adapted to receive a plurality of images respectively taken by a plurality of cameras, through wireless communications or otherwise, and concurrently display these images on an external monitor in a composite manner so that one of the images is selected to be recorded in the recording medium. A plurality of such image recording apparatuses are set in a place where a plurality of the above-described digital video cameras are present, so as to record an image selected among the images respectively taken by the digital video cameras. Thus, a moving image of enhanced content can be easily created.

In place of recording images individually, a composite of images may be recorded in a recording medium. For instance, an object is removed from a first image taken by a camera by using image recognition technique, and the left part of the screen is turned into a solid-colored background. Then, a second image from another camera is composited with the background of the first image. The image to be composited is selectable among all the images received.

It may be adapted such that a plurality of images are received from another network, in particular a wide area network such as the Internet, and an image is selected thereamong to be recorded. For instance, a moving image streamed over the Internet, and a still image found on a web site or read from a recording medium, for example, are composited in real time and the composite image is recorded in the recording medium. This enables to create a new content by selecting images with ease from a great number of contents in the Internet or those owned by the user, and compositing the selected images.

As described above, the imaging apparatus according to the invention can present a composite image which is made of an image taken by the imaging apparatus itself, and an image taken by and received from an external imaging apparatus by a communicator, so that a composite image made of these images is presented on a displayer to be viewed by the user who makes an image selector to select a desired image to record the selected image. Hence, the content of the recorded image is enriched, while the shooting opportunities are less missed. Further, it may be adapted such that a signal representative of the image taken by the imaging apparatus itself is transmitted to the external imaging apparatus through the communicator. In this case, each of a plurality of imaging apparatuses which are the same in structure can transmit an image taken by itself and receive an image taken by another apparatus, thereby enabling to selectively record an image.

The image recording method according to the invention enables each of a plurality of imaging apparatuses which are the same in structure to transmit an image taken by itself and receive an image taken by another apparatus, thereby enabling to selectively record an image. Further, the user of each imaging apparatus can view the images presented on a screen and select a desired one therefrom so as to record the selected image in a recording medium. Thus, the user of each imaging apparatus can enrich the content of the image recorded, and less misses shooting opportunities.

The invention claimed is:

1. An image recording apparatus for recording an inputted image, comprising:
   an image receiver which receives a signal of each of a plurality of images including at least one image taken by and transmitted from at least one external imaging apparatus;
   a display controller operable to display the inputted image and the at least one image received by the image receiver;
   an image recognizer which recognizes an image in which an object having set characteristics is present within the inputted image and the at least one received image; and
   a recording controller operable to control the recording of one or more selected images according to:
   a first result of an image recognition executed by the image recognizer on the inputted image and the at least one received image, and a second result associated with a priority ranking applied to the inputted image and the at least one received image.

2. The image recording apparatus of claim 1, further comprising:
   an image transmitter operable to transmit the inputted image to the at least one external imaging apparatus.

3. The image recording apparatus of claim 1, further comprising:
   a data separation portion operable to separate two images when the at least one received image taken by and transmitted from the at least one external imaging apparatus comprises the two images, wherein the separated two images are received by the recording controller.

4. The image recording apparatus of claim 1, further comprising:
   a characteristic setting portion operable to set the characteristics of the object, wherein the image recognizer receives the characteristics from the characteristic setting portion.

5. The image recording apparatus of claim 4, wherein the characteristics of the object comprise at least one color found in the object, and wherein the image recognizer provides color recognition processing based on the at least one color.

6. The image recording apparatus of claim 1, further comprising:
   a priority determining portion operable to set the priority ranking, wherein the recording controller receives the priority ranking from the priority determining portion.

7. The image recording apparatus of claim 6, wherein the priority ranking corresponds to a proximity of the object relative to the at least one external imaging apparatus.

8. The image recording apparatus of claim 6, wherein the priority ranking corresponds to an angular position associated with the at least one external imaging apparatus.

9. A method for recording images respectively taken by a plurality of imaging apparatuses, the method comprising:

receiving a signal of each of a plurality of images including at least one image taken by at least one external imaging apparatus;

displaying an inputted image and the received at least one image;

recognizing an image in which an object having set characteristics is present within the inputted image and the at least one received image; and controlling the recording of one or more selected images according to:

a first result executed by the recognizing of the image within the inputted image and the at least one received image, and a second result associated with a priority ranking applied to the inputted image and the at least one received image.

10. The method of claim 9, further comprising:
transmitting the inputted image to the at least one external imaging apparatus.

11. The method of claim 9, further comprising:
separating two images when the at least one received image taken by the at least one external imaging apparatus comprises the two images.

12. The method of claim 9, further comprising:
setting the characteristics of the object as at least one color; and
providing color recognition processing based on the at least one color.

13. The method of claim 9, further comprising:
setting the priority ranking as a proximity of the object relative to the at least one external imaging apparatus.

14. The method of claim 9, further comprising:
setting the priority ranking as an angular position associated with the at least one external imaging apparatus.

15. The method of claim 9, wherein:
if one or more images of the inputted image and the at least one received image include the object having the set characteristics, then, selecting an image from amongst the one or more images having the set characteristics based on the priority ranking corresponding to a highest priority, else, selecting an image from amongst the inputted image and the at least one received image based on the priority ranking corresponding to the highest priority.

16. A non-transitory computer readable recording medium for storing a computer program for recording images respectively taken by a plurality of imaging apparatuses, wherein the program comprises:

receiving a signal of each of a plurality of images including at least one image taken by at least one external imaging apparatus;

displaying an inputted image and the received at least one image;

recognizing an image in which an object having set characteristics is present within the inputted image and the at least one received image; and controlling the recording of one or more selected images according to: a first result executed by the recognizing of the image within the inputted image and the at least one received image, and a second result associated with a priority ranking applied to the inputted image and the at least one received image.

* * * * *